July 19, 1966     O. A. WURTENBERG     3,261,148
BAG-TYPE AIR FILTER

Filed Feb. 19, 1964            2 Sheets-Sheet 1

INVENTOR
OSCAR A. WURTENBERG

BY    W. E. Sherwood

ATTORNEY

July 19, 1966  O. A. WURTENBERG  3,261,148
BAG-TYPE AIR FILTER
Filed Feb. 19, 1964  2 Sheets-Sheet 2
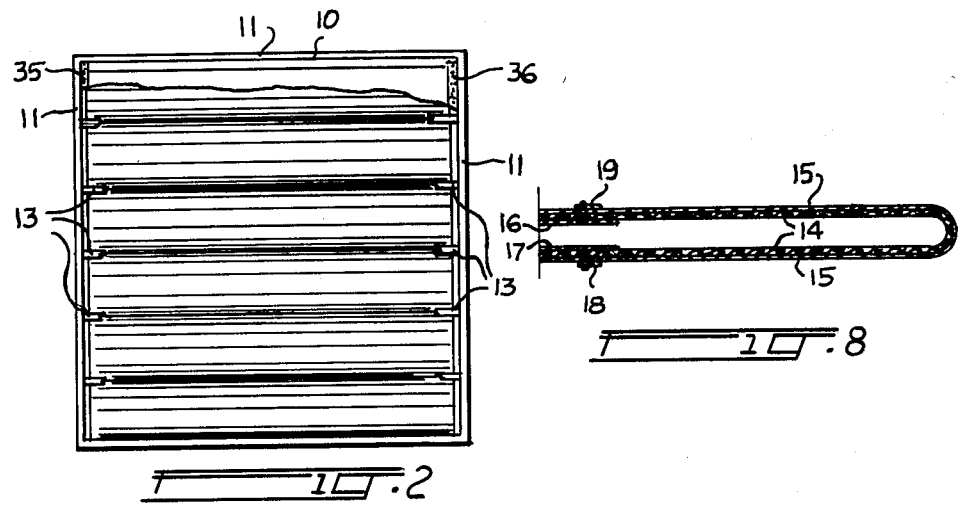
FIG. 2
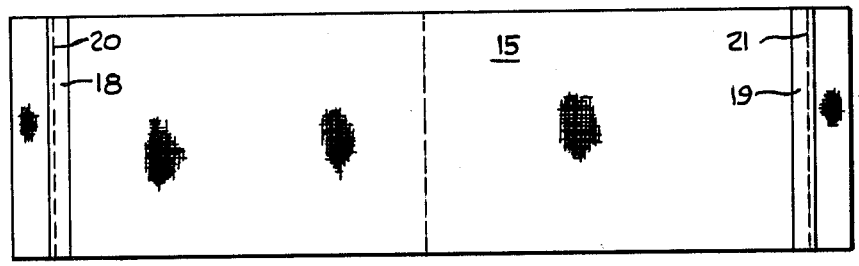
FIG. 5
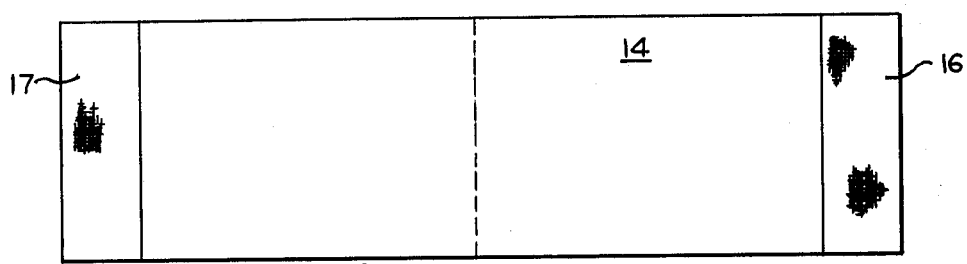
FIG. 6
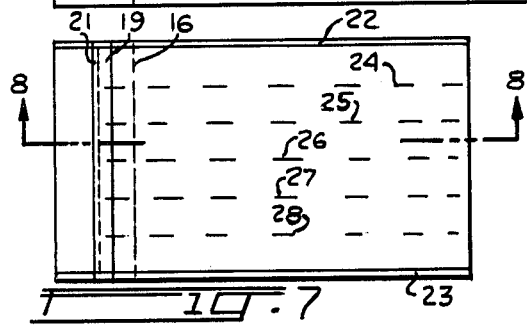
FIG. 7
FIG. 8
INVENTOR
OSCAR A. WURTENBERG
BY W. E. Sherwood
ATTORNEY

United States Patent Office 3,261,148
Patented July 19, 1966

3,261,148
BAG-TYPE AIR FILTER
Oscar A. Wurtenberg, Louisville, Ky., assignor to Continental Air Filters, Inc., Louisville, Ky., a corporation of Delaware
Filed Feb. 19, 1964, Ser. No. 346,006
3 Claims. (Cl. 55—341)

This invention relates to an improved high-efficiency, low-resistance, bak-type filter for removing dust and other particulate matter from gas streams, and more especially to filters of the bag type which are commonly employed in conjunction with and downstream from another filtering apparatus which has removed particles of gross size from that stream prior to reaching the bag-tpye filter from which a large gas handling capacity is expected.

Various bag-type filters have been proposed for this usage but so far as I am aware they have been characterized by structural features requiring apertured bag-supporting plates extending across the air stream at the entrance into the bags or by bag-spacing means located downstream from the entrance into the bags and which add to the cost of the filter and detract from the compact folding of the bags for storage or shipment. It is a purpose of the invention to make available a bag-type filter which avoids these conventional features and without detracting from its air-filtering abilities.

An object of the invention is to provide a simple and efficient bag-type air filter.

Another object is to provide an inexpensive, reliable light-weight air filter of the bag type.

Another object is to provide a bag-type air filter characterized by its comparatively low resistance, low turbulence, and low nozzle loss of pressure head.

A further object is to provide a bag-type air filter having its several bags attached to a frame in a novel manner affording reinforcement to the bags.

Other objects and advantages of the invention will become more apparent as the description proceeds and when considered in conjunction with the accompanying drawings:

FIG. 2 is an end elevation view with parts broken away of the rear of the filter shown in collapsed form for shipping.

FIG. 3 is a sectional view to a larger scale taken on line 3—3 of FIG. 1 and showing the attachment of two adjacent bags of the filter.

FIG. 4 is a sectional view to a larger scale taken on line 4—4 of FIG. 1 and showing a detail of the mounting of a bag to the frame.

FIG. 5 is a plan view of the filtered air side of a piece of filter medium prior to formation of the bag.

FIG. 6 is a plan view of the non-filtered air side of a piece of filter medium prior to formation of the bag.

FIG. 7 is a plan view of one side of the formed bag prior to installation in the frame and showing its filtered air side, and FIG. 8 is a sectional view taken on line 8—8 of FIG. 7.

Figure 1:
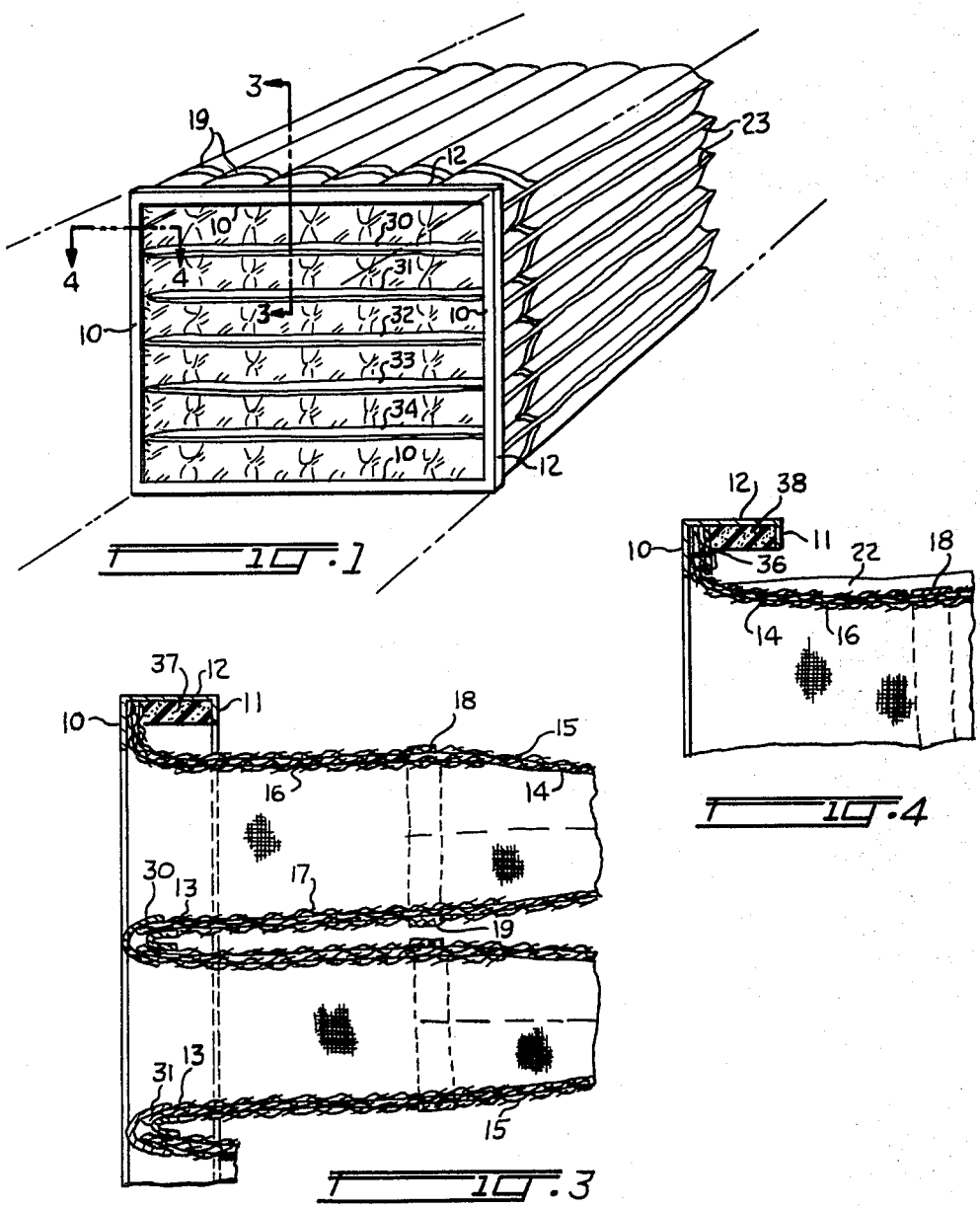
FIG. 1 is a perspective view of the filter shown in operative position within an air duct as indicated by dotted lines.

Referring first to FIGURES 1 and 2, the filter includes a generally rectangular, one-piece, open-ended, narrow frame preferably formed of a light-weight metal and which is adapted for removable positioning transversely of the air duct. This frame has a forward flange 10 which is slightly deeper than the companion rear flange 11 and with the flanges joined together by wall 12 to form an inwardly facing channel, the purpose of which will later appear. The sole spacing means required by the invention comprises a plurality of small straight rods or V-shaped supports 13 whose ends engage in the channel of opposite sides of the frame and may readily be sprung into place following the mounting of the several bags upon that frame. The number of supports so employed is one less than the number of bags and the supports are disposed on the filtered-air side of the bags.

Passing now to FIGS. 5 to 8, each of the bags is formed from a rectangular sheet of a suitable filter medium which may comprise, for example, a fluffy sheet of plastic or glass fibers 14 suitably matted together as a non-woven material and having a co-extensive backing layer 15 of nylon net or the like on its filtered-air side in order to provide additional tensile strength and to limit damage to the bag during handling. At the extreme ends of the sheet and arranged on the non-filtered-air side thereof, a pair of additional narrow pieces 16 and 17 of somewhat larger mesh net are positioned for the purpose of preventing erosion of the medium by the incoming gas and for retaining particles of medium which flake off the filter during use.

Extending transversely of the sheet 14 and on the filtered-air sides of both that sheet and the layer 15 of net are first and second narrow tensioning strips 18 and 19 of air-pervious nylon or the like sewn thereto by seams 20 and 21 adjacent the upstream edges of these strips. These strips serve a significant purpose as will later appear, including the establishment of the region in which gas moves from the manifold space into the several separate pocket portions of the bag and as will be seen in FIG. 7, the pieces 16 and 17 of the net on the non-filtered-air side of the bag extended farther toward the closed end of the bag than do these tensioning strips.

In fabricating the bag, the sheet 14 of FIG. 6 is folded upon itself and a pair of flexible side strips 22 and 23 of nylon or the like are sewed to the sheet and to the described nets and tensioning strips in order to form a filter bag having an open-mouth at one end.

A plurality of spaced parallel rows of pocket-defining fasteners 24, 25, 26, 27 and 28 are then affixed to the bag and these rows of fasteners which extend substantially to the closed end of the bag and terminate upstream adjacent the location of the tensioning strips serve to join opposite sides of the bag together and to form pocket spaces between adjacent rows. The fasteners may be of any suitable nature such as a series of closely spaced staples in each row, a sewed seam of thread, or other means.

Referring now to FIGS. 1, 3 and 4, the open mouth periphery of each bag along that portion of its mouth adjacent the nearest bag is joined to that nearest bag, as by sewing, with a flexible bag-supporting binding strip, extending transversely of the frame and formed of nylon or the like, those strips being shown at 30, 31, 32, 33 and 34. The location of the several supports 13 is such as to loosely contact the filtered air sides of these binding strips during use of the filter and to define thereby a series of manifold spaces, one at the entrance to each bag so supported in the filter frame. For the purpose of preventing by-passing or leakage of gas around the filter bags, the invention also provides for an improved mounting of portions of the bag mouths within the frame channel and as now to be described.

That portion of the bag mouth not so attached to a binding strip is coated with adhesive and is adhered to the inner face of the flange 10 of the frame. When this adhesive has set, a pair of elongated flexible, non-stretchable reinforcing bands 35 and 36 are affixed to the emplaced bag mouth portions along the opposite sides of the filter as by means of stapling to the bag material held in place by such adhesive. As will be noted, the shorter depth of flange 11 gives adequate space for emplacement of these bands and which bands lie in planes normal to the planes occupied by the several bag-supporting binding strips. Reinforcement for the mounting of the side edges of the bags arranged in the duct thus is effected when such bags distend under the influence of the pressure of the gas being filtered. As a further feature of reinforcement, the open space within the channel of the frame, following the described adhesive mounting of the open-mouth periphery portions of the several bags, is filled with bars of compressible plastic material having a generally rectangular cross section. Two such bars of space-filling material are shown at 37 and 38, in FIGS. 3 and 4, it being understood that the inner space within the frame channel is filled on all four legs of the frame in similar manner. In emplacing these bars of material following the prior assembly of the bags in place on the frame, each bar is coated on three sides with adhesive and then is moved into the channel. The bar accordingly adheres to the inner surfaces of the shallower flange of the frame, to the inner surface of the frame wall and to the mouth portion of the bag already adhered to the inner surface of the deeper flange of the frame, but does not adhere on its fourth side to the adjacent bag material. The presence of this bar of space-filling material thus keeps the bag material from abrasive contact with the edge of the flange 11 and from tending to billow outwardly into contact with the inner surface of the duct in which the filter is mounted and at the same time obstructs any tendency of the mouth of the bag to tear away from its adhesive bond on the frame.

As will now be apparent to those skilled in the art, when the filter is in use as indicated in FIG. 1, each bag distends under the pressure of air and the flexible tensioning strips 18 and 19 thereof assume a scalloped configuration providing in cooperation with the rows of fasteners, generally tubular pockets extending from those strips to the closed end of the bag. Air entering the bags, however, first moves into a header or manifold space between the adjacent binding strips at the mouths of the bags before being subdivided for movement into these tubular pockets. A slight increase in velocity of air occurs as it moves from the manifold to the pockets but due to the nozzle-like shape of the gathered bag material in this region, no appreciable loss of pressure head occurs. The protective nets 16 and 17, moreover, overlie this region of the inner surface of the filter medium and should the velocity of the air tend to scour off any of the filter medium at this point, those nets serve to oppose the loosening of the filter medium. After the air once enters the pockets of the bag, no further need exists for further protection from nets 16 and 17 and they accordingly are terminated at short distance downstream from the tensioning strips 18 and 19. The location of the seams 20 and 21 for the tensioning strips also is chosen so as to permit the major portion of those strips to billow freely outside the bags and to avoid any appreciable diminution in the filtering capacity of the bag due to the use of the tensioning strips.

The filter is relatively inexpensive and is economically suited for expendibility after once having served its purpose. Due to its simplicity and particularly to its freedom from need of elaborate bag spacing means, it can be easily assembled on a simple jig or assembly framework. Moreover, the simple supports 13 form no significant obstruction to flow of air and do not detract from the filtering capacity of the structure.

As seen in FIG. 2 the bags may be rolled into compact form for purpose of storage or for shipping, and merely by placing a wide band of paper or the like (not shown) transversely around the collapsed bags and the frame, the entire filter is packaged in a simple and inexpensive manner affording suitable protection thereto.

Having thus described the invention and its attendant advantages, it is intended that the appended claims are to cover such changes and modifications of the described invention as fall within the true spirit and scope of the invention.

What is claimed is:

1. A high-efficiency, bag-type air filter comprising, a channel-shaped rectangular frame having the channel facing inwardly thereof, a plurality of open-mouth bags whose peripheries at the open mouth are disposed in a plane generally coinciding with the plane of the upstream side of said frame, each of said bags having a plurality of pocket-defining fasteners extending in spaced parallel rows along the direction of flow of air into said bag and joining opposite sides of the bag together in order to subdivide the bag into generally tubular pockets during the flow of air under pressure therethrough, the upstream ends of said rows of fasteners terminating short of the open mouth of said bag, each bag having that portion of its open-mouth periphery nearest the adjacent bag joined thereto by a flexible bag-supporting binding strip extending transversely of the frame, the remainder of the open-mouth portion of the bag being affixed to the adjacent interior portion of said frame channel, a plurality of rigid parallel narrow supports extending transversely of said frame and in loose contact with the respective binding strips on the filtered air sides thereof, the ends of said supports being confined within the channel of said frame at opposite sides of said frame, each of said bags having a first and a second flexible tensioning strip attached thereto and extending transversely of the bag on the respective filtered air sides of the bag and located downstream from said supports and at the upstream ends of said rows of fasteners thereby to form a manifold space for such bag between its binding and tensioning strips and with which space the intake ends of the bag pockets communicate and without requiring spacer means other than said narrow supports, said flexible tensioning strips for each bag upon passage of air under pressure into the bag serving jointly to adopt a generally circular shape between adjacent rows of fasteners of the bag and to define a nozzle-like entrance into the pockets of the bag.

2. An air filter as defined in claim 1 including a layer of net material attached to each of said bags at their mouths and disposed on the unfiltered air sides of said bags, said net material terminating at a point downstream of said nozzle-like entrances into said pockets of said bags and adjacent the tensioning strips of said bags.

3. An air filter as defined in claim 1 wherein said tensioning strips comprise air-pervious material attached to said bag by a stitched thread seam and with the unstitched portions of said tensioning strips being in loose contact with the bag material.

References Cited by the Examiner

UNITED STATES PATENTS

| 1,779,458 | 10/1930 | Annis | 55—341 |
| 1,830,096 | 11/1931 | Dollinger | 55—500 |
| 2,080,154 | 5/1937 | Strindberg | 55—500 |
| 2,243,353 | 5/1941 | Martinet et al. | 55—382 |
| 2,409,078 | 10/1946 | Swann | 55—499 X |
| 2,907,408 | 10/1959 | Engle et al. | 55—500 |
| 3,124,440 | 3/1964 | Hogg | 55—484 |
| 3,124,441 | 3/1964 | Rivers | 55—500 |
| 3,160,908 | 12/1964 | Peabody et al. | 55—379 X |
| 3,170,777 | 2/1965 | Held | 55—490 |
| 3,190,059 | 6/1965 | Bauder et al. | 55—491 |

ROBERT F. BURNETT, *Primary Examiner.*